United States Patent
Ghosh et al.

(10) Patent No.: US 11,516,012 B2
(45) Date of Patent: *Nov. 29, 2022

(54) SYSTEM, APPARATUS AND METHOD FOR PERFORMING A PLURALITY OF CRYPTOGRAPHIC OPERATIONS

(71) Applicant: Intel Corporation, Santa Clara, CA (US)

(72) Inventors: Santosh Ghosh, Hillsboro, OR (US); Andrew H. Reinders, Portland, OR (US); Sudhir K. Satpathy, Hillsboro, OR (US); Manoj R. Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 17/144,216

(22) Filed: Jan. 8, 2021

(65) Prior Publication Data

US 2021/0126786 A1 Apr. 29, 2021

Related U.S. Application Data

(62) Division of application No. 15/982,278, filed on May 17, 2018, now Pat. No. 10,924,276.

(51) Int. Cl.
*H04L 9/30* (2006.01)
*G06F 7/72* (2006.01)
*G06F 7/544* (2006.01)
*G06F 7/00* (2006.01)

(52) U.S. Cl.
CPC ............. *H04L 9/3066* (2013.01); *G06F 7/00* (2013.01); *G06F 7/5443* (2013.01); *G06F 7/723* (2013.01); *G06F 7/725* (2013.01); *H04L 9/302* (2013.01); *H04L 2209/122* (2013.01); *H04L 2209/125* (2013.01)

(58) Field of Classification Search
CPC .. H04L 9/3066; H04L 9/302; H04L 2209/122; H04L 2209/125; G06F 7/00; G06F 7/5443; G06F 7/723; G06F 7/725
USPC .......................................................... 380/28
See application file for complete search history.

(56) References Cited

U.S. PATENT DOCUMENTS

| | | | |
|---|---|---|---|
| 2002/0039418 A1* | 4/2002 | Dror ....................... | G06F 7/728 380/28 |
| 2010/0146028 A1* | 6/2010 | Lambert ................. | G06F 7/728 380/28 |
| 2015/0092941 A1 | 4/2015 | Ghosh | |
| 2017/0061832 A1 | 3/2017 | Ghosh et al. | |

(Continued)

*Primary Examiner* — Jacob Lipman
(74) *Attorney, Agent, or Firm* — Trop, Pruner & Hu, P.C.

(57) ABSTRACT

In one embodiment, an apparatus includes a hardware accelerator to execute cryptography operations including a Rivest Shamir Adleman (RSA) operation and an elliptic curve cryptography (ECC) operation. The hardware accelerator may include a multiplier circuit comprising a parallel combinatorial multiplier, and an ECC circuit coupled to the multiplier circuit to execute the ECC operation. The ECC circuit may compute a prime field multiplication using the multiplier circuit and reduce a result of the prime field multiplication in a plurality of addition and subtraction operations for a first type of prime modulus. The hardware accelerator may execute the RSA operation using the multiplier circuit. Other embodiments are described and claimed.

21 Claims, 13 Drawing Sheets

(56) References Cited

U.S. PATENT DOCUMENTS

2017/0187530 A1 6/2017 Ghosh et al.
2017/0353298 A1 12/2017 Ghosh

* cited by examiner

SYSTEM, APPARATUS AND METHOD FOR PERFORMING A PLURALITY OF CRYPTOGRAPHIC OPERATIONS

This application is a divisional of U.S. patent application Ser. No. 15/982,278, filed May 17, 2018, the content of which is hereby incorporated by reference.

TECHNICAL FIELD

Embodiments relate to integrated circuits, and more particularly to an integrated circuit including cryptographic circuitry.

BACKGROUND

Cryptographic operations are used in many different situations. Some current cryptographic techniques are used for public key cryptography, secure booting operations, attestations and so forth. In such use cases and others, two key types, namely Rivest Shamir Adleman (RSA)-based keys and elliptic curve cryptography (ECC)-based keys, can be used. These key types are expected to be long lived, particularly as the length of such keys increases over time.

Current systems typically implement software techniques to execute these cryptographic primitives. However, such hardware techniques incur long latencies. Other techniques seek to use hardware circuitry. However, such techniques suffer from expense in die area, power consumption and so forth. This is especially the case, as different hardware would be required for performing the different operations.

DETAILED DESCRIPTION

In various embodiments, a specialized dedicated hardware cryptographic circuit is provided. By way of this cryptographic circuit, various cryptographic operations including public key cryptographic operations may be performed in a more efficient manner as compared to the overhead of performing such operations in general purpose processing circuitry. That is, with a cryptographic circuit as described herein such operations may be performed with reduced latency and reduced power consumption. Still further, the cryptographic circuit itself may be formed with minimal chip real estate.

Although specific cryptographic circuits are described herein having particular bit widths, understand the scope of the present invention is not limited in this regard, and in other embodiments different widths of circuitry may be present. Nevertheless, in various embodiments the cryptographic circuitry may be configured to process atypical bit widths. That is, instead of providing conventional computation circuitry having even bit widths (and more typically corresponding to a given power of two), embodiments provide computation circuitry having atypical bit widths of, e.g., 27×411-bits. With such computation circuitry as described herein, disparate cryptographic operations including Rivest Shamir Adleman (RSA) and elliptic curve cryptographic (ECC) operations may be performed in the same circuitry.

Figure 1:
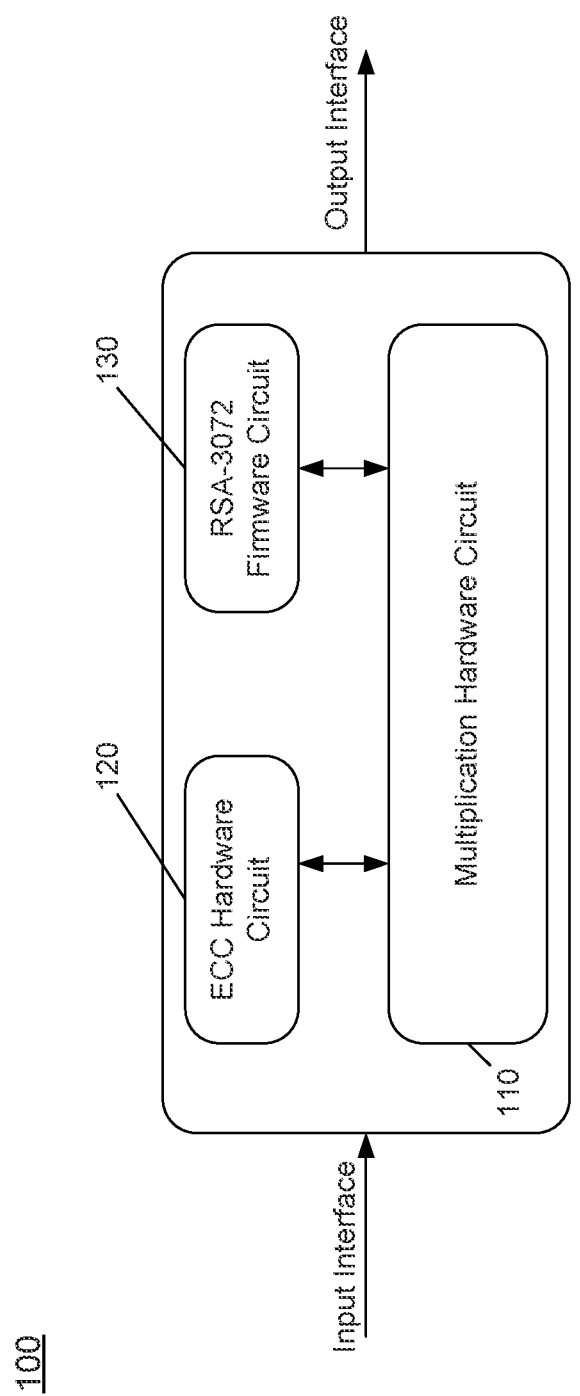
FIG. 1 is a block diagram of a cryptographic circuit in accordance with an embodiment of the present invention.

Referring now to FIG. 1, shown is a block diagram of a cryptographic circuit in accordance with an embodiment of the present invention. More specifically as shown in FIG. 1, cryptographic circuit 100 may be implemented as a public key cryptography (PKC) hardware engine. Although this circuit may be implemented in many different types of integrated circuits including general purpose processors, system on chips (SoCs) and so forth, in many embodiments such circuit may be implemented in a field programmable gate array (FPGA). In such implementations, this cryptographic circuit may be dedicated hardware circuitry that performs public key signature verification and authentication of firmware modules and incoming bitstreams. As such, the FPGA may not be programmed with a bitstream until a correct sign and verification operation is completed. To this end, the FPGA may include multiple field programmable logic blocks, referred to herein as programmable arrays, which may be programmed by incoming bitstreams. These programmable logic blocks or arrays may be configured to perform various functions and operations, such as acceleration operations that can be offloaded from a main processor.

As illustrated in FIG. 1, cryptographic circuit 100 includes multiple hardware circuits including a multiplication hardware circuit 110. In embodiments, multiplication hardware circuit 110 may be implemented as a parallel combinatorial multiplication circuit that can operate at high speeds (e.g., according to a clock signal at a given operating frequency. In one embodiment, multiplication hardware circuit 110 may be implemented as a 27×411-bit multiplication circuit to receive a 27-bit operand A and a 411-bit operand B and produce a 438-bit output R=A*B in a single clock cycle. For multiplication of two 384-bit numbers, the 27×411 bit multiplier is used iteratively 15 times to produce the 768-bit result. As such, latency for multiplication of two 384-bit numbers is 16 clock cycles in an embodiment. With this high speed multiplication capability, multiplication hardware circuit 110 may be used to compute modulus multiplications for both ECC-384 and RSA-3072 sign and verify operations. With a 16 clock cycle latency, such operations can be performed significantly faster than in a conventional multiplier circuit. As an example, embodiments may realize 24 times faster operation than conventional multiplication hardware.

Still with reference to FIG. 1, cryptographic circuit 100 further includes an ECC hardware circuit 120. ECC hardware circuit 120 may be configured to perform ECC-384 operations. In an embodiment, ECC hardware circuit 120 may utilize the high-speed multiplication hardware of multiplication hardware circuit 110 to compute large prime field multiplications. Further, by exploiting the modulus structure of a National Institute of Standards and Technology (NIST)-384 curve, ECC hardware circuit 120 may use an integer addition-based technique to perform fast modulus reductions (instead of division or multiplications as in the typical case).

Still with reference to FIG. 1, cryptographic circuit 100 further includes an RSA firmware circuit 130. More specifically RSA firmware circuit 130 may be configured to compute RSA-3072 operations. In an embodiment, RSA firmware circuit 130 may be implemented as a hybrid hardware/firmware design to balance low die area and minimal latency. As will be described herein, RSA firmware circuit 130 may perform sign and verify and modulus exponentiation by using a plurality of multiplication-accumulation instructions to be executed in multiplication hardware circuit 110. Further, the firmware layer of RSA firmware circuit 130 may re-utilize temporary registers in multiplication hardware circuit 110 to load a plurality of 384-bit operands (instead of loading them one at a time in a naive approach) to perform a plurality of multiplications and accumulations. In this way, substantially fewer write and read transactions between firmware and hardware occur as compared to the naive approach.

Although implementations can vary in design layout, complexity and so forth, in one embodiment cryptographic circuit 100 may be implemented in a design having approximately 177,000 gates of die area. In addition cryptographic circuit 100 may operate with approximately 0.549 milliseconds (ms) and 1.59 ms latency for ECC-384 and RSA-3072 verify operations, respectively. Embodiments may thus substantially reduce latency for signature and verify operations for ECC-384, in a combined ECC and RSA solution substantially smaller than conventional circuitry. Embodiments thus provide flexibility for choosing between ECC and RSA techniques for fast secure boot and attestation services with minimal area.

Figure 2:
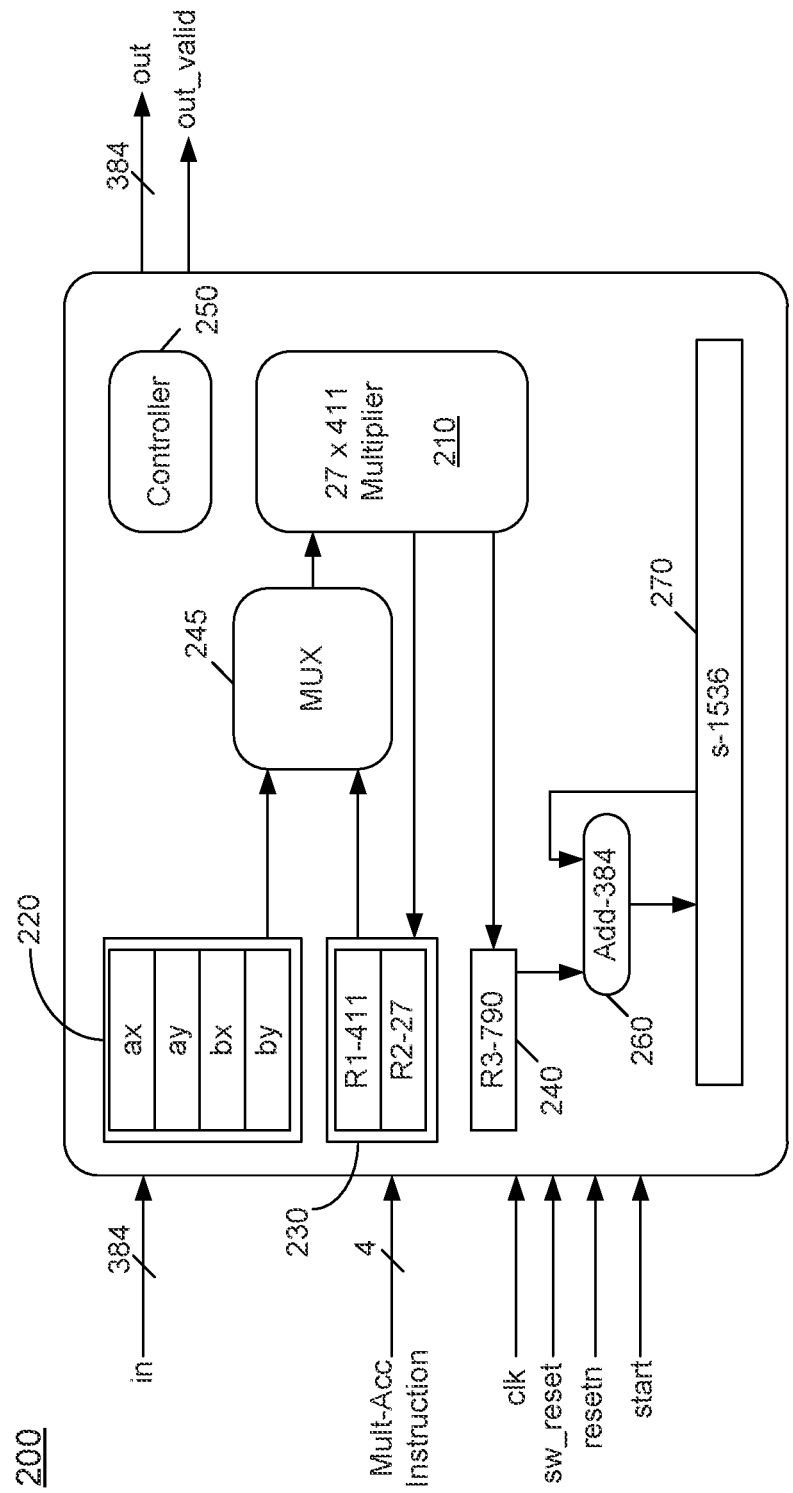
FIG. 2 is a block diagram of further details of a multiplication hardware circuit in accordance with an embodiment.

Referring now to FIG. 2, shown is a block diagram of further details of a multiplication hardware circuit in accordance with an embodiment. As shown in FIG. 2, multiplication circuit 200 includes a 27×411-bit multiplier 210. In embodiments, multiplier 210 may be implemented as a parallel combinatorial multiplier. Multiplier 210 may be configured to perform integer multiplication operations of two values having 384-bit widths. More specifically, a first operand (e.g., a multiplier) may be segmented into 27-bit segments, each of which may be multiplied with a second operand (e.g., a multiplicand) in a given iteration. In this way, in a relatively few number of clock cycles, namely 16 clock cycles, circuit 200 may multiply two 384-bit numbers. Multiplication circuit 200 also may further support nine different 384-bit multiply-accumulate operations (e.g., a*b+c, b*c+a, . . . ) which can be used for RSA-3072 operations.

Table 1 lists example multiply-accumulate operations in accordance with one embodiment, where ax, ay, bx, by are 384 bits and s-1536 is a 1536-bit register.

TABLE 1

| Instruction | Description |
| --- | --- |
| mult_axbxAout384 | Multiply ax and bx, add with s-1536, update result in s-1536, result out least 384 bits, shift right 384 |

TABLE 1-continued

| Instruction | Description |
| --- | --- |
| mult_aybxA | Multiply ay and bx, add with s-1536, updated result in s-1536 |
| mult_axbyAout384 | Multiply ax and by, add with s-1536, updated result in s-1536, result out least 384 bits, shift right 384 |
| mult_aybyA | Multiply ay and by, add with s-1536, updated result in s-1536 |
| mult_axbxA | Multiply ax and bx, add with s-1536, updated result in s-1536 |
| mult_aybxA2 | Multiply ay and bx, add with s-1536 from $384^{th}$ bit, updated result in s-1536 |
| mult_axbyA2 | Multiply ax and by, add with s-1536 from $384^{th}$ bit, updated result in s-1536 |
| mult_aybyA3 | Multiply ay and by, add with s-1536 from $768^{th}$ bit, updated result in s-1536 |
| mult_aybyAout768 | Multiply ay and by, add with s-1536, updated result in s-1536, result out least 768 bits |

Referring now to Table 2, shown are example multiply-accumulate operations for execution in a multiplier circuit in accordance with another embodiment.

TABLE 2

| Instruction | Description |
| --- | --- |
| mult_axbxA | Multiply ax and bx, add with s-1536, update result in s-1536 |
| mult_aybxA2 | Multiply ay and bx, add with s-1536 most significant 1152 bits, updated result in s-1536 |
| mult_axbyA2 | Multiply ax and by, add with s-1536 with most significant 1152 bits, updated result in s-1536 |
| mult_aybyA3 | Multiply ay and by, add with s-1536 most significant 768 bits, updated result in s-1536 |
| mult_aybyA | Multiply ay and by, add with s-1536, updated result in s-1536 |
| shift_out768 | Output n to cx, d to cy. Right shift 768-bit and updated result in s-1536 |

As seen in FIG. 2, in addition to multiplier 210, multiplication circuit 200 further includes one or more register files. In the embodiment shown, a first register file 220 includes a plurality of general purpose registers (ax, ay, bx, by), each of which may store a 384-bit value. Such values (or portions thereof) may be provided to multiplier 210 via a multiplexer 245. Multiplexer 245 (and the remaining circuitry of multiplication circuit 200) may be controlled by a controller 250. In embodiments, controller 250 may execute microcode or other instructions to perform multiplication, multiply-accumulate and other operations. Furthermore, controller 250 may provide control of counting of iterations of various multiplication and other operations within multiplication circuit 200.

As further illustrated in FIG. 2, an additional register file 230 may include registers for storage of various values. Still further, another register 240 may provide for storage of a result of a multiplication in multiplier 210 (namely a 768-bit result). Register 240 may be coupled to an adder 260, which may perform an accumulation operation between this result information and an additional value (such as an intermediate result) obtained from another register 270, which in an embodiment may be a 1536-bit register. Controller 250 generates respective control signals in every clock cycle that select the appropriate input bits for multiplier 210 and adder 260. While shown at this high level in the embodiment of FIG. 2, many variations and alternatives are possible.

Figure 3:
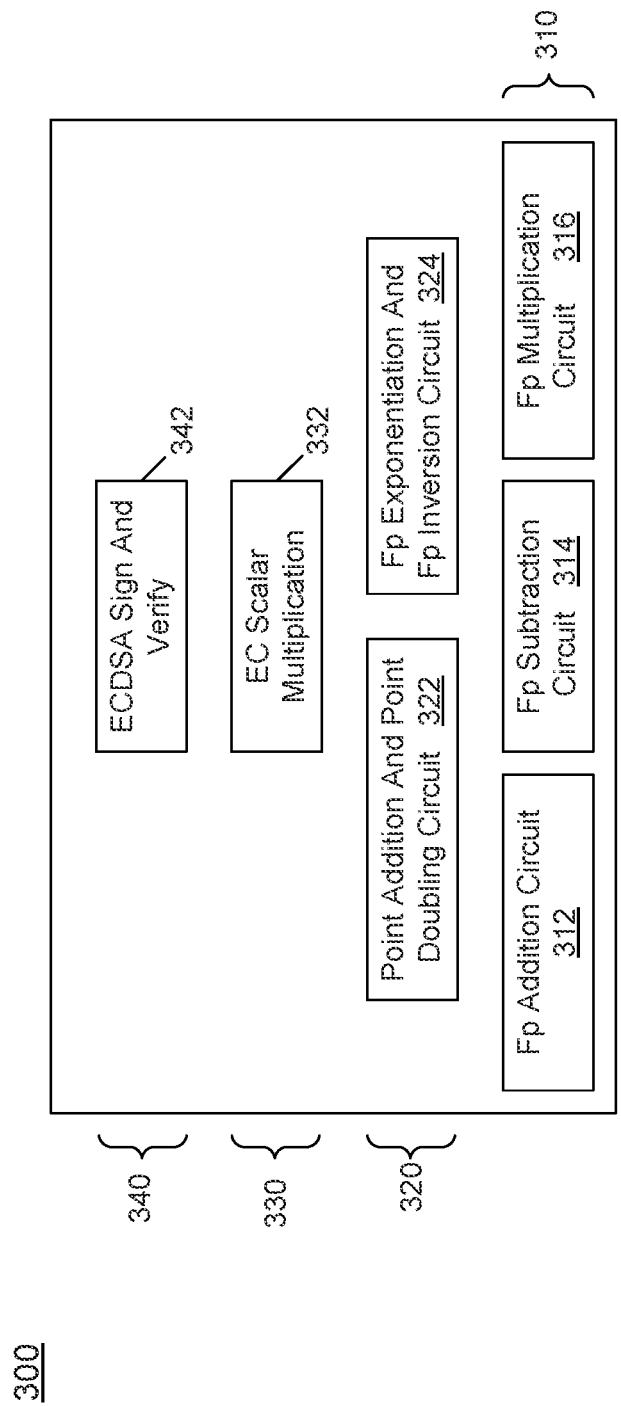
FIG. 3 is a block diagram of an ECC hardware circuit in accordance with an embodiment.

Referring now to FIG. 3, shown is a block diagram of an ECC hardware circuit 300 in accordance with an embodiment. As shown in FIG. 3, ECC hardware circuit 300 may be implemented as a plurality of layers. The plurality of layers may be implemented in hardware to avoid read-write latency overhead of intermediate operations between multiplication hardware and memory. As shown, a first layer 310 includes a prime field addition circuit 312, a prime field subtraction circuit 314 and a prime field (Fp) multiplication circuit 316. In embodiments, multiplication circuit 316 may realize ultra-low latency ECC operations via execution of two intermediate operations, namely an integer multiplication operation and a modulus reduction operation. More specifically, prime field multiplication circuit 316 may be configured to perform an integer multiplication to compute R=A*B, where R is 768 bits and A, B are 384 bits. In an embodiment, prime field multiplication circuit 316 may leverage multiplication hardware circuit 200 to perform this integer multiplication. In turn, the modulus reduction operation reduces the 768-bit integer multiplication result to a 384-bit final Fp multiplication result less than the modulus P.

Still with reference to FIG. 3, a second layer 320 includes a point addition and point doubling circuit 322 and a prime field exponentiation and prime field inversion circuit 324. The circuits of second layer 320 may be used for elliptic curve sign, verify, encryption and key exchange operations. In turn, a third layer 330 includes an Elliptic Curve (EC) scalar multiplication circuit 332. Finally, a fourth layer 340 includes a signature generation and verification circuit 342, which may be configured to perform ECDSA sign and verify operations. In embodiments, fourth layer 340 may use all underlying layers to complete a sign/verify operation.

ECC circuit 300, and more particularly prime field multiplication circuit 316, may leverage multiplication circuit 200 of FIG. 2 for performing an integer multiplication portion of an ECC intermediate operation. In turn, this same circuit may also perform a modulus reduction operation to reduce an intermediate product of the integer multiplication to a final prime field multiplication result that is less than a modulus P. Embodiments may reduce overhead latency of modulus reduction operations, especially for NIST prime modulus reductions. That is, for an NIST prime modulus reduction, there is no need for any multiplication or division operations. Note that an NIST prime p384 is a generalized Mersenne prime of the form: $p384=2^{384}-2^{128}-2^{96}+2^{32}-1$. With this prime modulus, a modulus reduction of a 768-bit integer multiplication result can be performed with a plurality of 384-bit Fp additions/subtractions (e.g., 10), which in total may be executed in 5 clock cycles in ECC circuit 300.

In turn for general primes, including Brainpool and SM2 elliptic curve primes, prime field multiplication circuit 316 may perform a modulus reduction based on a generic Barrett reduction method. In embodiments, this modulus reduction operation may reduce 24 bits from an intermediate multiplication result per iteration in accordance with the following operations:

Operation 1. Estimate the best reduction value:
1.1. Multiply 27-bit Barrett constant (Q) with most significant 411-bit intermediate reduction result $$c_{437:0} \leftarrow Q_{26:0} * m_{767:357}$$

1.2. Multiply most significant 27-bit of c with prime modulus $$D_{410:0} \leftarrow c_{437:411} * p_{383:0}$$

Operation 2. Reduce most significant 24-bit from the 2k-bit product $$m \leftarrow m_{767:357} - D_{410:0}$$

Operation 3. Left shift the intermediate result by 24-bits $$m_{767:24} \leftarrow m_{743:0}, m_{23:0} = 0.$$

Operation 4. Repeat Operation 1 to Operation 3 16 times
Operation 5. If $m_{767:384} > p_{383:0}$ then $m_{767:384} = m_{767:384} - p_{383:0}$
Operation 6. Return $m_{767:384}$.

Figure 4:
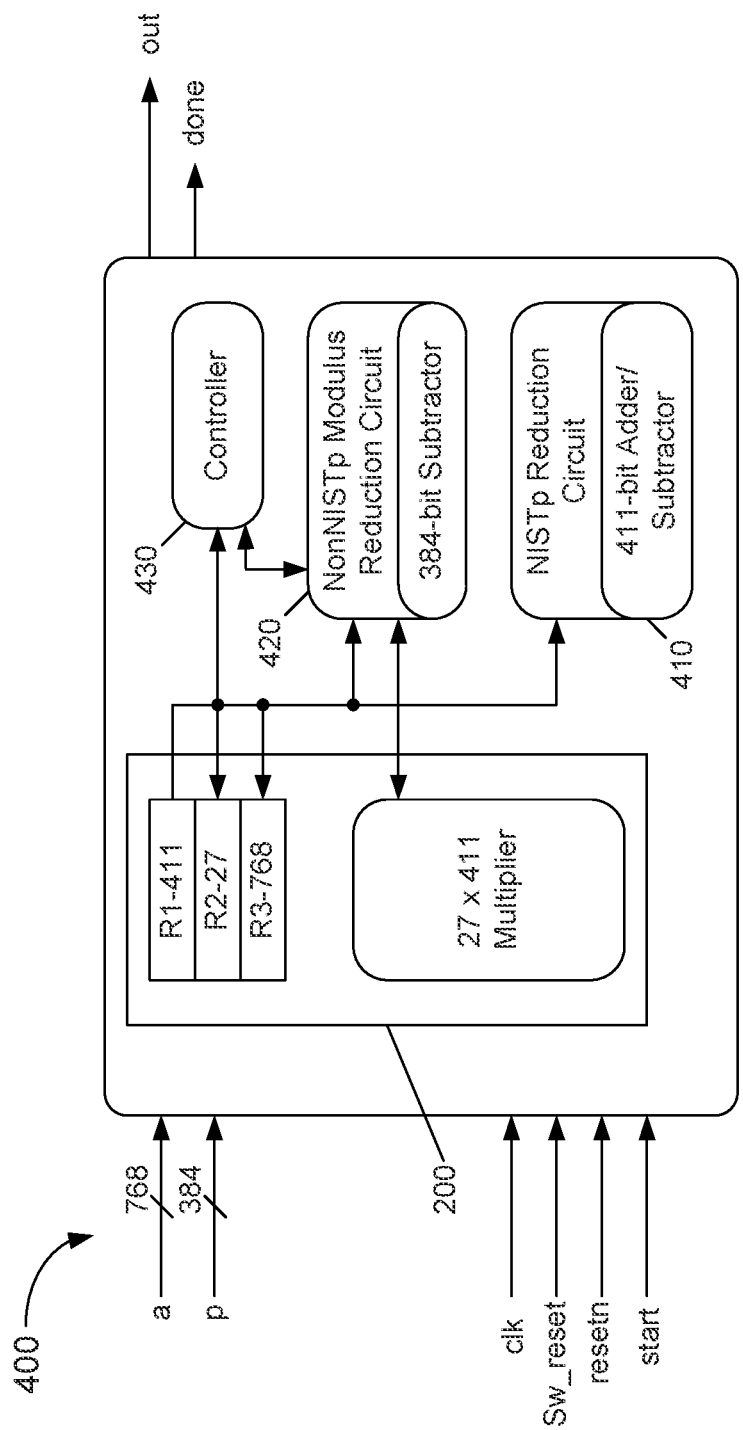
FIG. 4 is a block diagram of a modulus reduction circuit in accordance with an embodiment.

Referring now to FIG. 4, shown is a block diagram of a modulus reduction circuit, which may be implemented within an ECC circuit as described herein. As shown in FIG. 4, modulus reduction circuit 400 may leverage multiplier circuitry of multiplier circuit 200 for performing low latency modulus reduction operations. As further illustrated, this circuitry couples to a controller 430, which may control the modulus reduction operations. In addition, multiple modulus reduction circuits 410 and 420 are provided. More specifically, a first modulus reduction circuit 410 may be provided for NIST reductions, using 384-bit adder/subtractor circuitry. And in turn for non-NIST modulus reduction operations, a second modulus reduction circuit 420 may include a 411-bit subtractor.

Note that for performing RSA encryption/decryption and sign/verification operations, additional circuitry may be present in a cryptographic circuit as described above. More specifically as illustrated with reference back to FIG. 1, cryptographic circuit 100 may include a RSA firmware circuit 130 to perform such RSA operations, which may be based on modulus exponentiation operations. For RSA-3072 techniques, this modulus exponentiation operation may be performed on two 3072-bit numbers. Each modulus exponentiation ($a^e$ mod n) involves 3072 modulus squares ($a^2$ mod n) and on average 1536 modulus multiplications (a*b mod n) on 3072-bit numbers. For simplicity, a modulus square is considered to be the same as a modulus multiplication of the same two operands, i.e., a*a mod n. In an embodiment, the 3072-bit modulus multiplications are computed in two operations: Operation 1: compute R=a*b, where a, b are 3072-bit operands and R is a 6144-bit result; and Operation 2: perform 3072-bit modulus reduction, r=R mod n, where R is 6144 bits and r, n are 3072 bits long.

Embodiments may leverage the observation that memory read/writes over a fabric dominate latency of modulus multiplications and thus, RSA-3072 execution. For reducing reads and writes, the principle of locality may be applied on 384-bit chunks of 3072-bit operands. More specifically, 384-bit multiplications may be isolated for computing the Operation 1 multiplication above.

Figure 5:
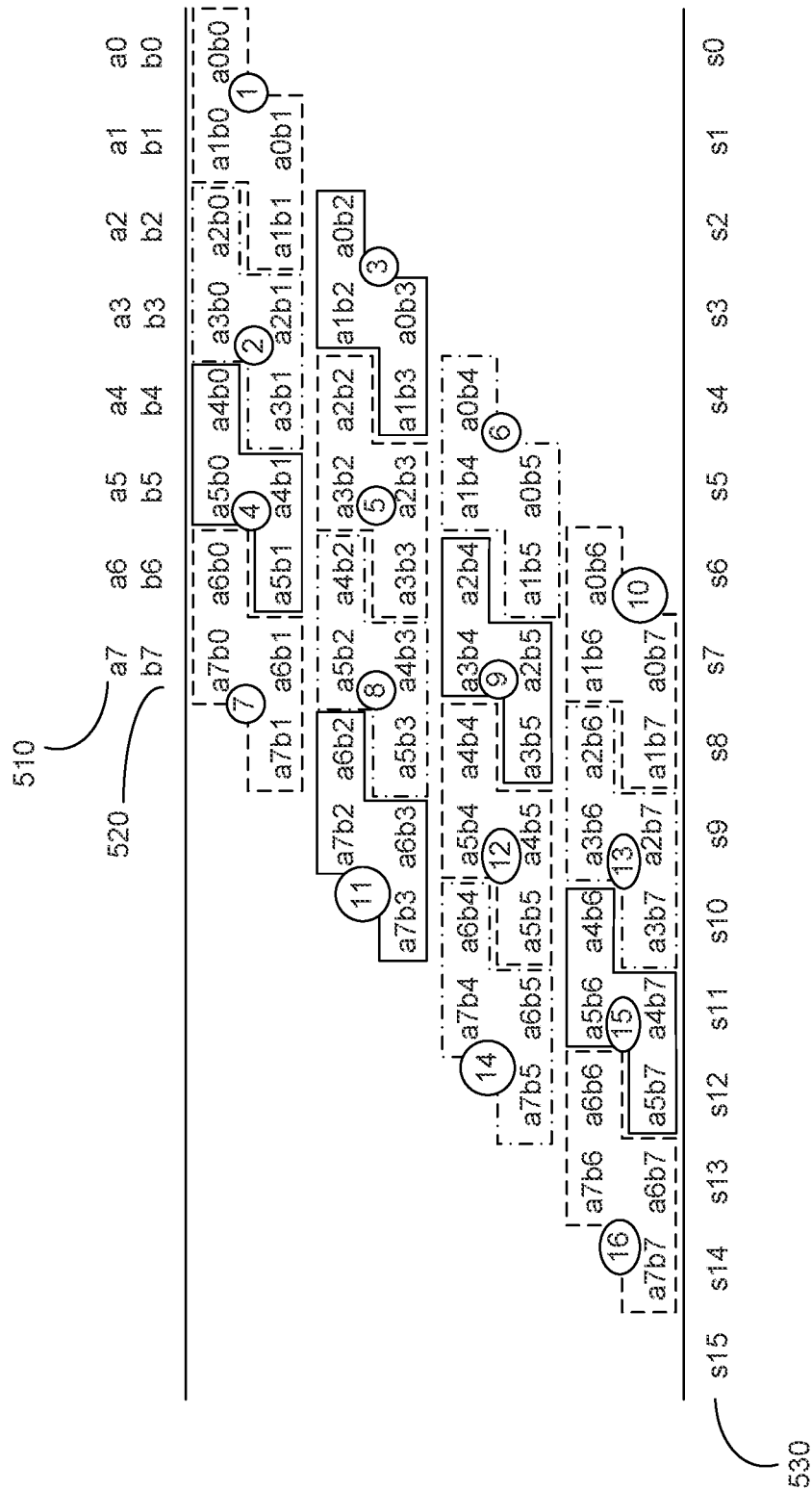
FIG. 5 is a graphical illustration of a multiplication operation of 3072-bit numbers in accordance with an embodiment.

Referring now to FIG. 5, shown is a graphical illustration of a multiplication operation of 3072-bit numbers in accordance with an embodiment. As seen in FIG. 5, these 3072-bit values 510, 520 (namely operands a and b) may be segmented into 384-bit portions. Thus as seen, operand A may be segmented into eight segments, a0-a7. And similarly, operand B may be segmented into eight segments, b0-b7. As further illustrated in FIG. 5, isolated groups of two segments of each of these operands may be obtained concurrently and operated on in a multiplier circuit to generate partial products. In a particular embodiment, such multiplication operations may be performed using the 27×411-bit multiplication hardware circuit described herein. As such, one of the operands can be further segmented into 27-bit portions as described above.

In any event, with the isolated memory accessing (reading of four segments: two for a first operand and two for a second operand), and performing multiple multiplication operations on each of these segments (each of which in turn may include multiple multiplications of different 27-bit portions of one operand with the full 384-bit width of the second operand), efficient multiplication operation occurs.

As illustrated in FIG. 5, a plurality of isolated groups (1-16) of four 384-bit integer multiplications are shown. Note as illustrated in FIG. 5, 16 different chunks (1-16) of each of the two operands are obtained, each including two segments of the first operand and the two segments of the second operand. And for each of these obtained chunks, three or four individual multiplication operations may be performed (in turn which may be implemented using 27-bit× 384-bit intermediate multiplication operations). In this way, an efficient result is realized to generate a 6144-bit product 530 formed of 16 individual segments s0-s15. Note that these individual segments may be formed via accumulate operations for the corresponding partial product results of the given column. For example, segment s1 is formed from an accumulation of the partial products of a1b0 and a0b1. Similarly, segment s4 is formed of an accumulation of the previous carry and the partial products of a4b0, a3b1, a2b2, a1b3, a0b4.

Figure 6A:
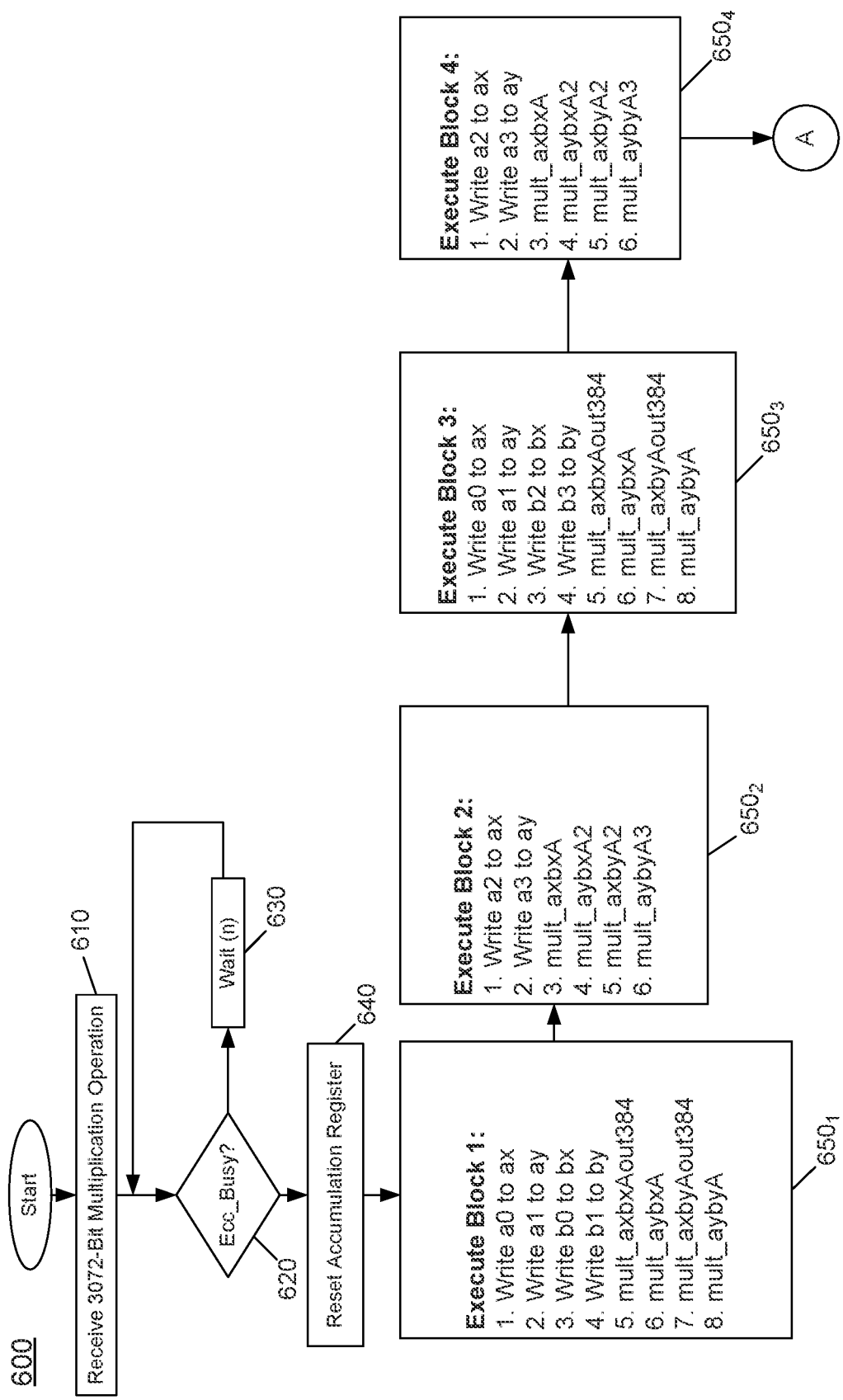
FIGS. 6A and 6B are flow diagrams of a method in accordance with an embodiment of the present invention.
Figure 6B:
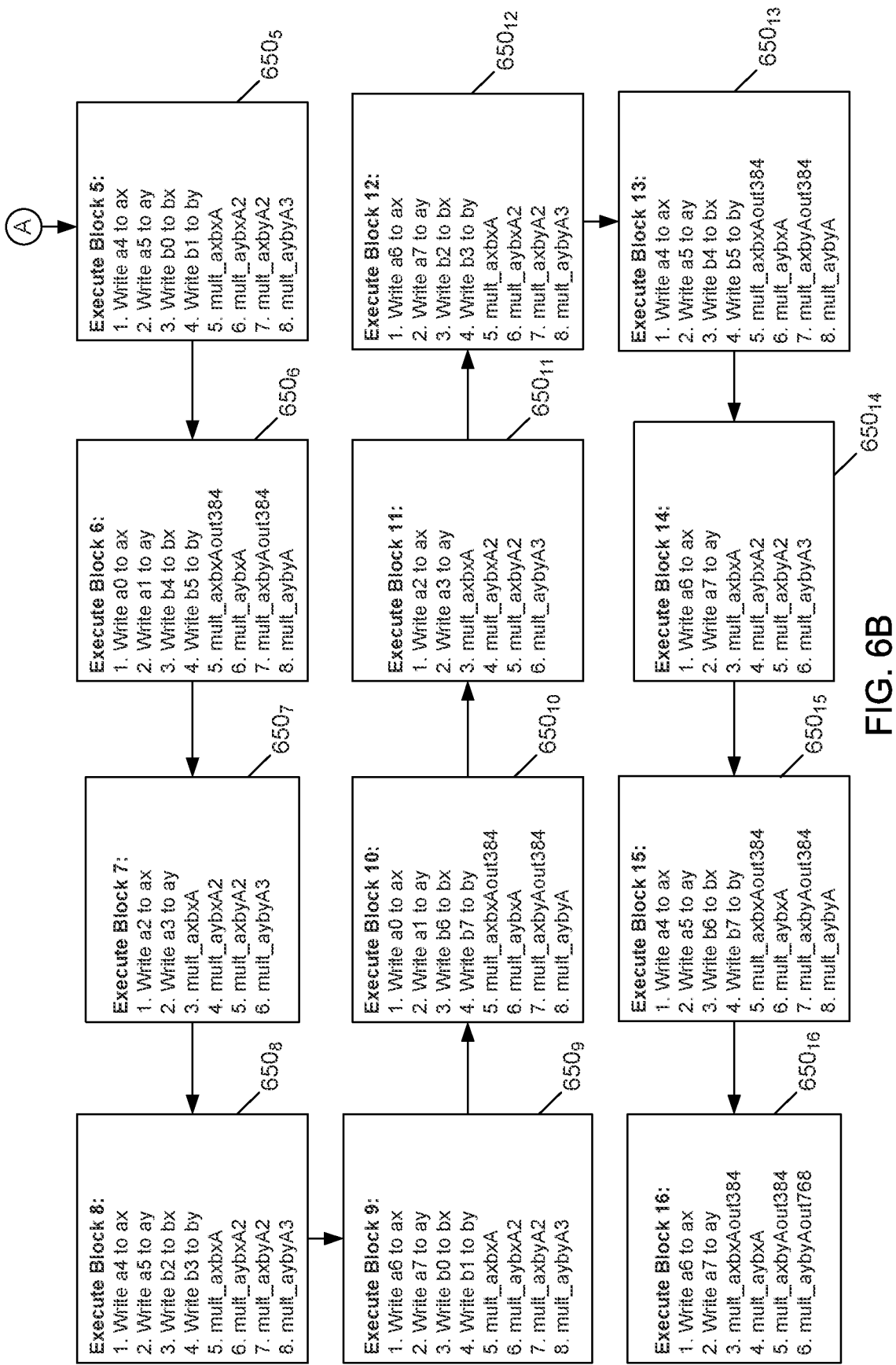

Referring now to FIGS. 6A and 6B, shown are flow diagrams of a method in accordance with an embodiment of the present invention. More specifically, FIGS. 6A and 6B are flow diagrams for performing a 3072-bit multiplication of two operands using a high speed multiplication hardware circuit in accordance with an embodiment. As such, method 600 may be performed by hardware circuitry, firmware, software and/or combinations thereof. In a particular embodiment, hardware control circuitry, such as an RSA circuit (e.g., RSA firmware circuit 130) may be configured to execute operations that in turn leverage a multiplier circuit such as hardware multiplier circuit 200 of FIG. 2. As illustrated in FIG. 6A, in response to receiving a multiplication operation (block 610), more specifically a 3072-bit multiplication operation, it is determined whether ECC circuitry is busy (diamond 620). If so, a wait operation may occur at block 630. Otherwise control passes to block 640 where an accumulation register (e.g., a 1536-bit register) may be reset. Thereafter control passes to block $650_1$.

As illustrated in FIG. 6A, a plurality of operations may be performed at block $650_1$. More specifically, these operations are individual instructions to be performed by a microcontroller to write operands into the multiplication hardware circuit and specify the particular multiplication-accumulation operation to the multiplication hardware circuit. In a specific embodiment, note that the particular arithmetic operations may be performed using the instructions described above with regard to Table 1. Note further that these arithmetic operations performed at block $650_1$ correspond to the multiplication operations on 384-bit segments a0, a1, and b0, b1 as discussed above in FIG. 5.

As further illustrated in FIGS. 6A and 6B, similar operations occur at blocks $650_2$-$650_{16}$ for performing further read and arithmetic operations on additional 384-bit chunks of the two operands. Understand while shown with these particular sets of operations, implemented by way of the instructions identified, other arrangements are possible. For example, in some cases other instruction formats may be used, such as shown in Table 2. Through an embodiment as in FIGS. 6A and 6B, writes and reads may be substantially reduced as compared to a conventional technique.

The 3072-bit modulus reduction r=R mod n may be performed by a Barrett's reduction via multiplication-accumulations executed inside a multiplication hardware circuit. The 3072-bit Barrett constants Q may be computed once per RSA operation. In one embodiment, the following operations are performed to generate r=R mod n.

a. Estimate the Barrett multiplier S as the most significant 3072-bits of Q*R. In this operation, only the upper half of the multiplication of FIG. 5 is computed.
b. Compute the least significant 3072-bit of T=S*n. This operation exploits the fact that the most significant 3072 bits of T will match with the same of R. Therefore, in this operation, only the lower half of the multiplication of FIG. 5 is computed.
c. Compute least significant 3072-bits of s=R−T
d. If s>n then r=s−n, else r=s.

In summary, for a 3072-bit modulus reduction, only the half of the 384-bit multiplications that are involved in above operations a and b are computed, which reduces by approximately 50% multiplications as compared to a traditional Barrett reduction technique.

Figure 7:
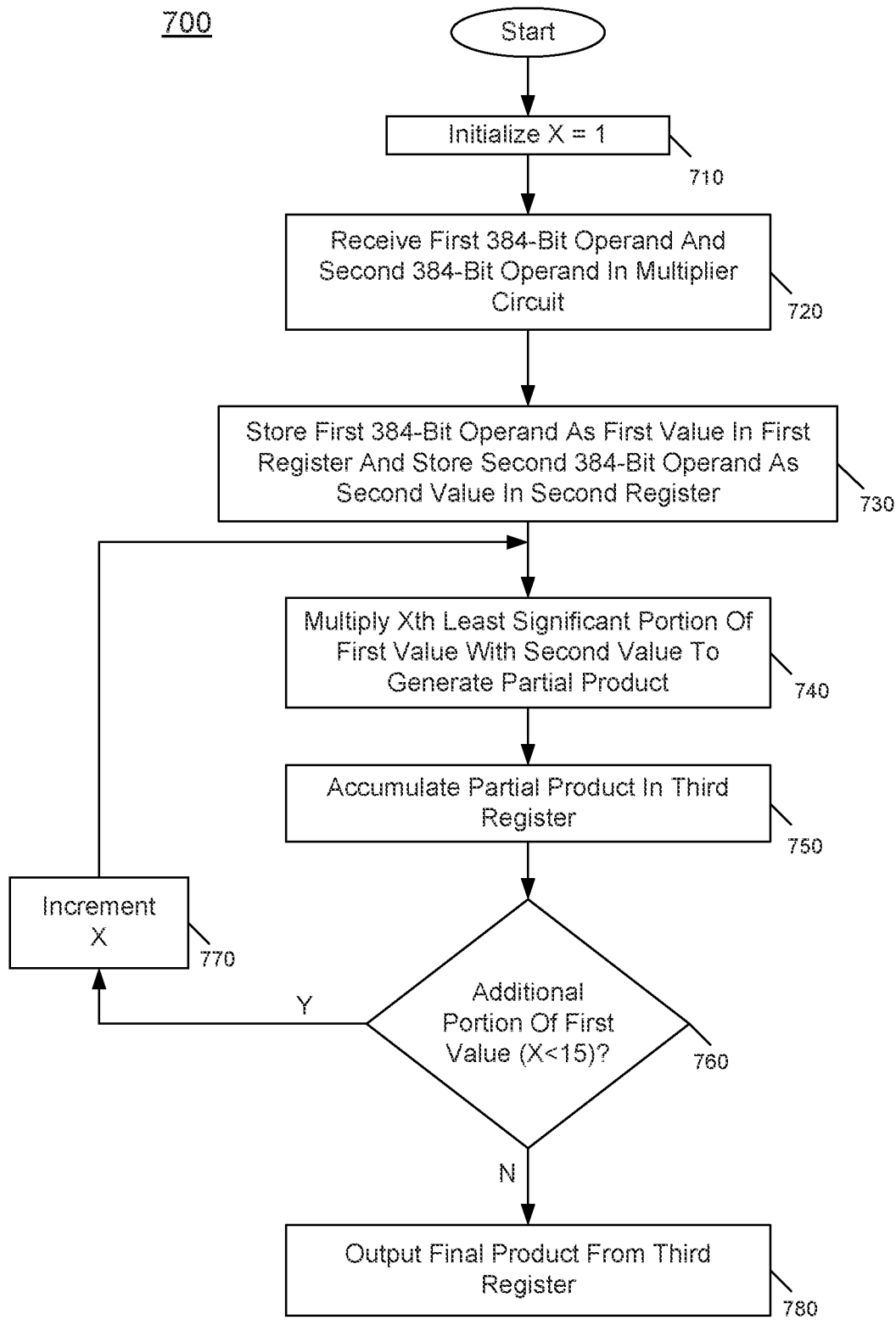
FIG. 7 is a flow diagram of a method in accordance with another embodiment of the present invention.

Referring now to FIG. 7, shown is a flow diagram of a method in accordance with another embodiment of the present invention. As shown in FIG. 7, method 700 is a method for performing low latency multiplication operations as described herein. In an embodiment, method 700 may be performed by hardware circuitry, firmware, software and/or combinations thereof. In a particular embodiment, method 700 may be performed by a hardware multiplication circuit (such as multiplication circuit 200 of FIG. 2). To this end, a microcontroller or other programmable processing circuit within or associated with the multiplier circuit may execute method 700. As seen, method 700 begins by initializing a count value (x) to one. Thereafter at block 720 first and second operands may be received in the multiplier circuit. Such numbers may be read from memory. For purposes of discussion herein, assume that the multiplication is to be of two 384-bit numbers. Thereafter, control passes to block 730 for storage of these operands in registers, such as general-purpose registers of the multiplier circuit.

Still with reference to FIG. 7, next at block 740 a given least significant portion of the first value may be multiplied with the second value to generate a partial product. In a particular embodiment, this given portion of the first value may be a 27-bit value. Of course, depending upon a given bit width of the multiplier circuit, different segmentations of values can occur. In any event, control next passes to block 750 where the partial product may be accumulated in a third register. Such register may be at least 768 bits wide, such that it may accommodate the full product of the 384-bit multiplication. Next it is determined at diamond 750 whether there is an additional portion of the first value that has yet to be executed upon, which may be based on the counter value. If it is determined that this counter value x is less than a predetermined value (namely 15), control passes to block 770 where x is incremented. Otherwise if it is determined that the full values have been operated upon (as determined by the analysis at diamond 760), control passes to block 770 where the final product may be output from the third register. As discussed above, for multiplication of two 384-bit numbers, the resulting product is 768 bits. Understand while shown at this high level in the embodiment of FIG. 7, many variations and alternatives are possible.

Figure 8:
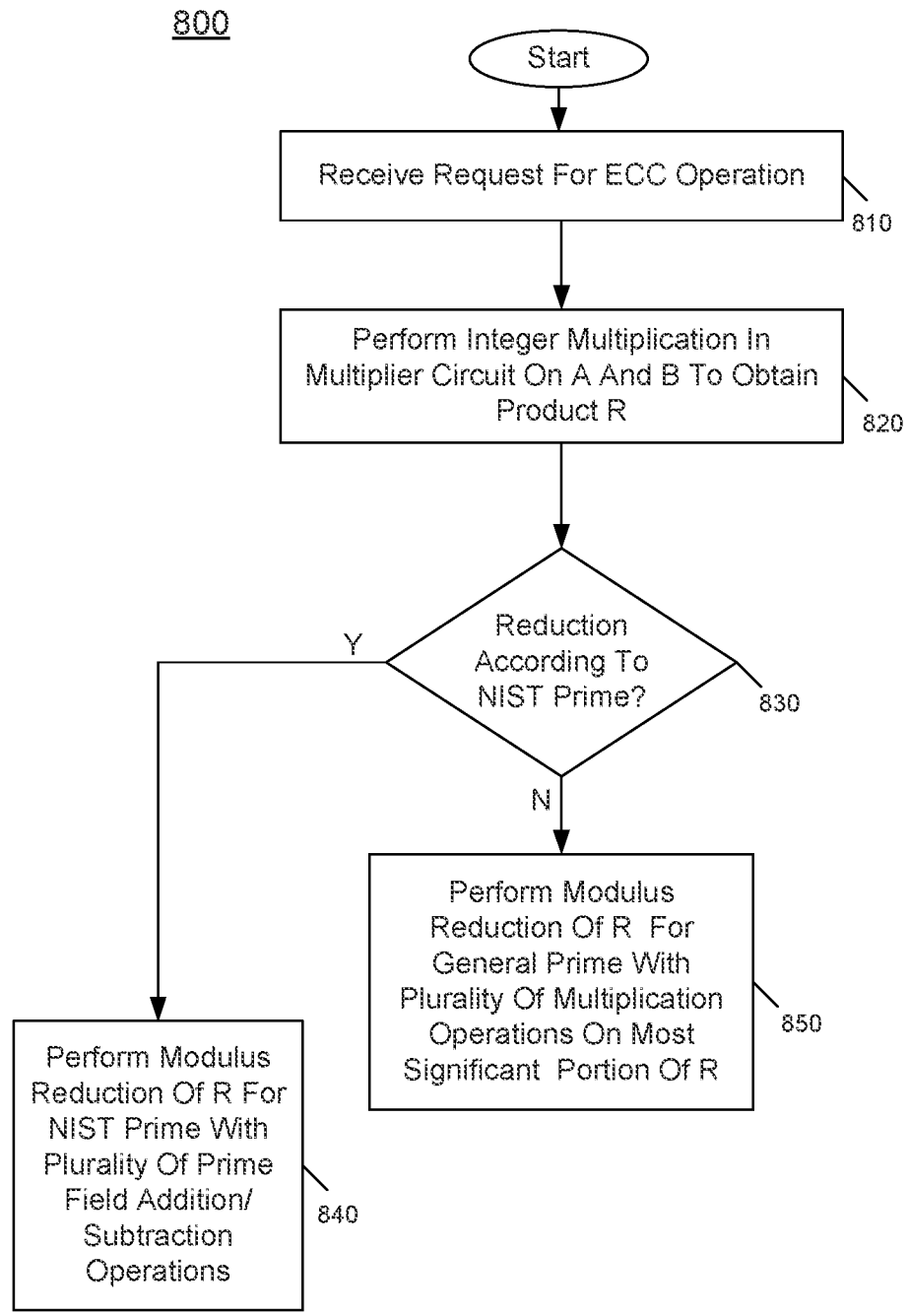
FIG. 8 is a flow diagram of a method in accordance with a still further embodiment of the present invention.

Referring now to FIG. 8, shown is a flow diagram of a method in accordance with yet another embodiment of the present invention. More specifically, FIG. 8 is a method for controllably performing ECC operations based at least in part on a particular prime value to be used. In an embodiment, method 800 may be performed by hardware circuitry, firmware, software and/or combinations thereof. In one specific embodiment, method 800 may be performed by an ECC hardware circuit, such as ECC circuit 300 of FIG. 3. As illustrated, method 800 begins by receiving a request for an ECC operation (block 810). Such request may be received in the circuit from a host processor, firmware or so forth that in turn receives a request for performing, e.g., a sign and verify operation.

Still with reference to FIG. 8, control next passes to block 820 where an integer multiplication operation is performed. More specifically, this integer multiplication may be performed on two operands (A and B, which may be 384-bit values) to generate a product R. Note that in embodiments herein, a multiplication hardware circuit can be reused by the ECC circuit to reduce chip costs. As such, the multiplication operation at block 820 may be performed in accordance with method 700 of FIG. 7, in one embodiment.

Still referring to FIG. 8, next it is determined whether a reduction of this product is to be according to a NIST prime (diamond 830). If so, control passes to block 840 to perform the modulus reduction of the product R. This modulus reduction using a NIST prime may be performed by execution of a plurality of prime field addition/subtraction operations. As such, the computation and power consumption expense of multiply and divide operations as would conventionally be performed may be avoided. Otherwise if reduction is determined not to be according to a NIST prime and instead according to a generalized prime, control passes to block 850 where the modulus reduction may be performed for a general prime. In this modulus reduction operation, multiple multiplication operations may be performed on the most significant portion of the result, which may reduce computation expense and latency. Understand while shown at this high level in the embodiment of FIG. 8, many variations and alternatives are possible.

Figure 9:
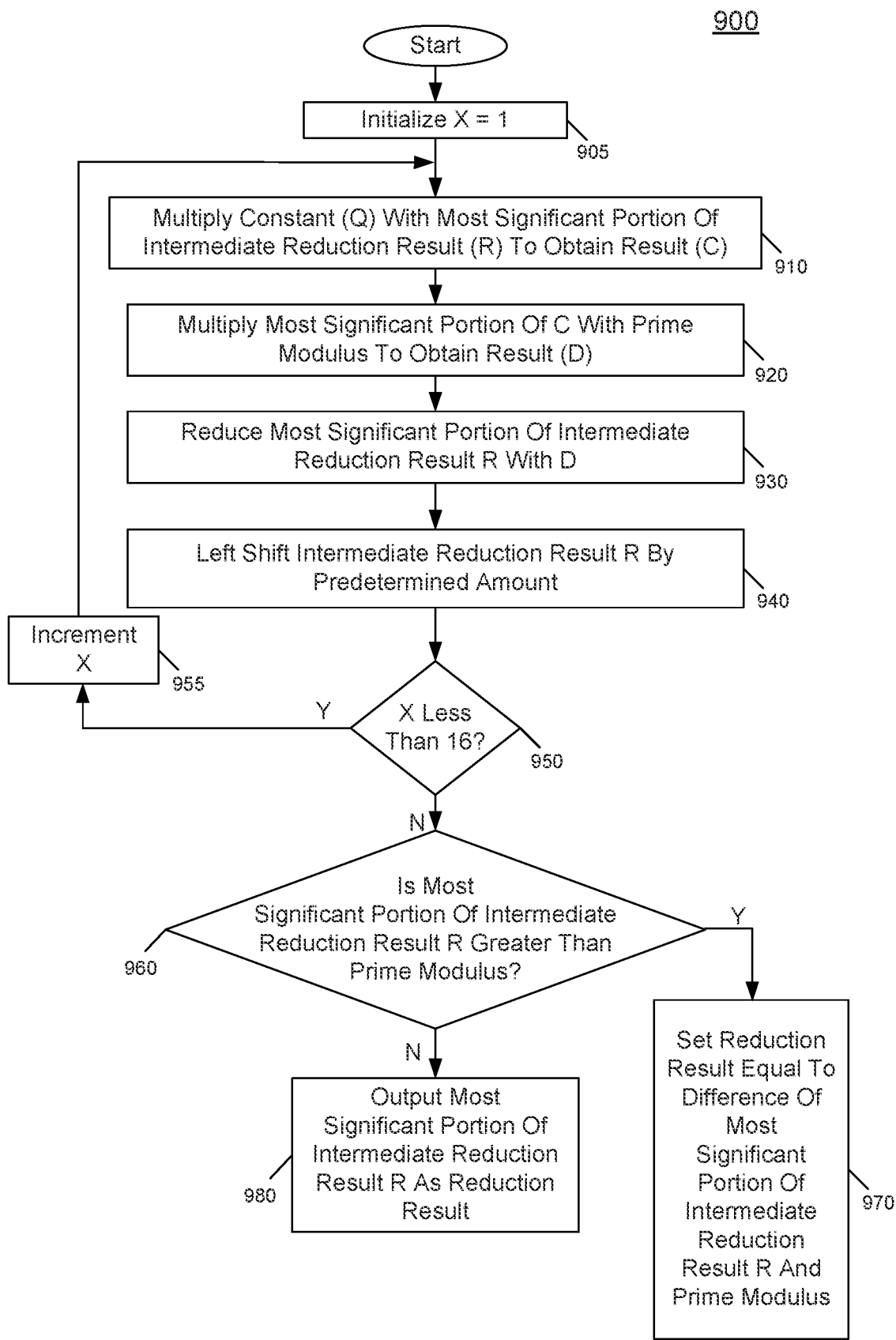
FIG. 9 is a flow diagram of a method in accordance with yet another embodiment of the present invention.

Referring now to FIG. 9, shown is a flow diagram of a method in accordance with a still further embodiment of the present invention. As shown in FIG. 9, method 900 is a high level view of performing a modulus reduction operation for ECC cryptographic operations in accordance with an embodiment. As such, method 900 may be performed by hardware circuitry, firmware, software and/or combinations thereof. In one specific embodiment, method 900 may be performed by an ECC hardware circuit, such as ECC circuit 300 of FIG. 3.

As illustrated, method 900 begins by initializing a count value (x) to a predetermined value (namely 1) (block 905). Thereafter at block 910 a constant (Q), which may be a Barrett constant, namely a 27-bit Barrett constant is multiplied with a most significant portion of an intermediate reduction result (R) to obtain a result (C). Note that the intermediate reduction result R is the resulting product of an integer multiplication. In an embodiment for 384-bit ECC operations, understand that the most significant portion of this intermediate reduction result may be the most significant 411 bits (namely bits 767:357). Next at block 920 the most significant portion of C is multiplied with the prime modulus to obtain another result (D). In a particular embodiment, the most significant 27 bits of this result C may be multiplied with the prime modulus. Thereafter at block 930, a most significant portion of the intermediate result may be reduced with this result D. In a particular embodiment, this reduction operation is a subtraction in which the result D is subtracted from the most significant 411 bits of the intermediate reduction result. Next at block 940 the intermediate result may be left shifted by a predetermined amount (e.g., 24 bits). In this way, a predetermined value (e.g., 0) may be right shifted into the intermediate result. Next at diamond 950 it is determined whether the counter value is less than a predetermined value (e.g., 16). If so, control passes to block 955 where the counter value may be incremented, and then control passes back to block 910.

Still with reference to FIG. 9, otherwise if this loop of operation is completed, control passes to diamond 960 to determine whether the most significant portion of the resulting intermediate reduction result is greater than the prime modulus. If so, control passes to block 970 where the reduction result may be set equal to a difference of this most significant portion of the intermediate reduction result and the prime modulus. Otherwise if it is determined at diamond 960 that the prime modulus exceeds the most significant portion of the intermediate reduction result, control passes to block 980, where this portion of the intermediate reduction result is output as the reduction result.

Figure 10:
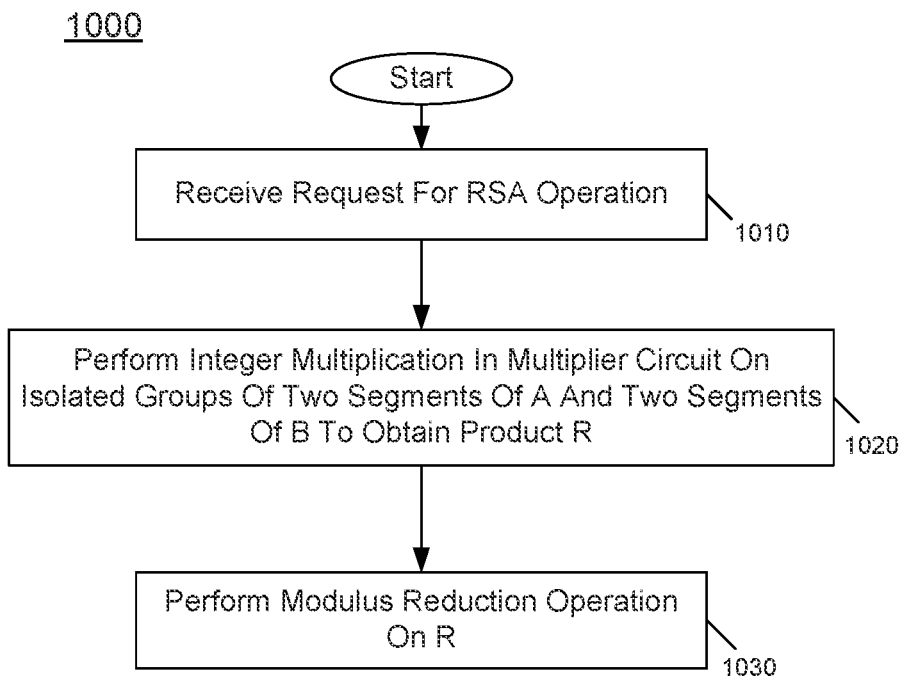
FIG. 10 is a flow diagram of a method in accordance with an additional embodiment of the present invention.

Referring now to FIG. 10, shown is a flow diagram of a method in accordance with an additional embodiment of the present invention. More specifically, method 1000 is a high level view of performing an RSA cryptographic operation in accordance with an embodiment. As such, method 1000 may be performed by hardware circuitry, firmware, software and/or combinations thereof. In one specific embodiment, method 1000 may be performed by RSA firmware circuit 130 of FIG. 1.

As illustrated, method 1000 begins by receiving a request for an RSA operation (block 1010). Next at block 1020 an integer multiplication is performed in a multiplier circuit. More specifically, this integer multiplication, which may be on 3072-bit values can be realized using a hardware multiplier circuit as described herein by isolating smaller groups of these operands and performing multiplications thereon. More specifically as shown in FIG. 10, this integer multiplication may be performed on isolated groups of two segments of a first operand A and two segments of a second operand B to obtain a resulting product, here a 6144-bit product. With this isolating of different portions of a larger value, a limited number of read and write operations may occur, as the four values (namely two segments of the first operand and two segments of the second operand) may be obtained and then multiplication operations on these different groupings can occur, such as shown in FIG. 6 above. Thereafter, at block 1030 a modulus reduction operation is performed on this result R. And more specifically, as described further below with regard to FIG. 11, this modulus reduction operation can be performed on only portions of the result (namely a most significant portion) to reduce computation complexity and latency. Understand while shown at this high level in the embodiment of FIG. 10, many variations and alternatives are possible.

Figure 11:
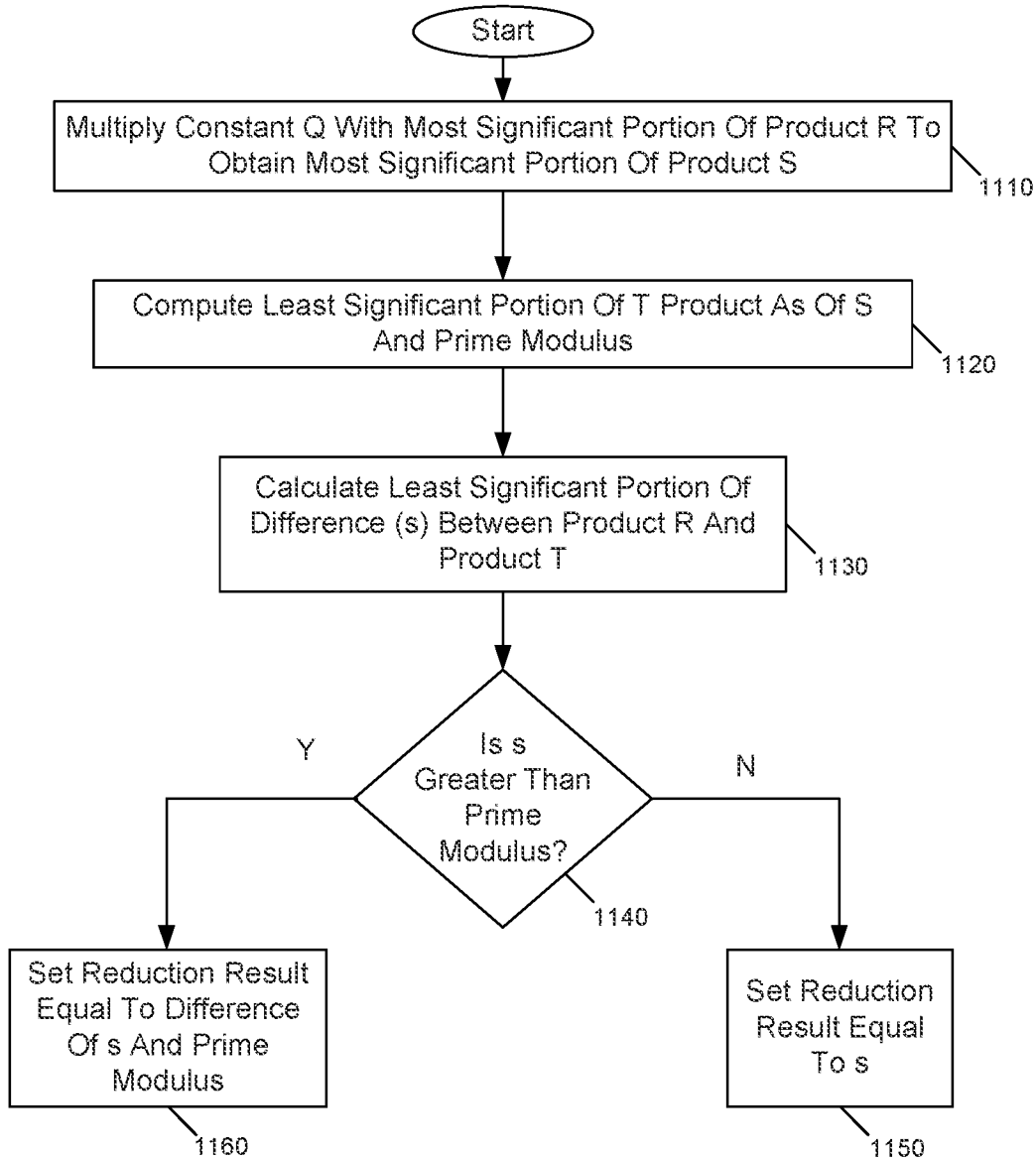
FIG. 11 is a flow diagram of a method in accordance with yet another embodiment of the present invention.

Referring now to FIG. 11, shown is a flow diagram of a method in accordance with yet another embodiment of the present invention. As shown in FIG. 11, method 1100 is a high level view of performing a modulus reduction operation for an RSA cryptographic operation in accordance with an embodiment. As such, method 1100 may be performed by hardware circuitry, firmware, software and/or combinations thereof. In one specific embodiment, method 1100 may be performed by an RSA firmware circuit, such as RSA firmware circuit 130 of FIG. 1.

As illustrated, method 1100 may reduce compute complexity and latency by performing operations on only portions of a resulting 6144-bit product obtained, e.g., in accordance with method 1000 of FIG. 10. Method 1100 begins at block 1110 where a constant (Q), e.g., a 3072-bit Barrett constant, is multiplied with a most significant portion of the intermediate reduction result (R) to obtain a result (S). Note that the intermediate reduction result R is the resulting product of the integer multiplication of FIG. 10. Next at block 1120 the least significant portion of a product T (where T equals S*n) is obtained by multiplying T by the prime modulus n. Thereafter at block 1130, the least significant portion of a difference (s) is calculated. This difference is the difference between the product R and the product T. Next at block 1140 it is determined whether this difference is greater than the prime modulus. If so, control passes to block 1160 where the reduction result may be set equal to a difference of s and the prime modulus. Otherwise, the reduction result is set equal to s (block 1150). Understand while shown at this high level in the embodiment of FIG. 11, many variations and alternatives are possible.

Figure 12:
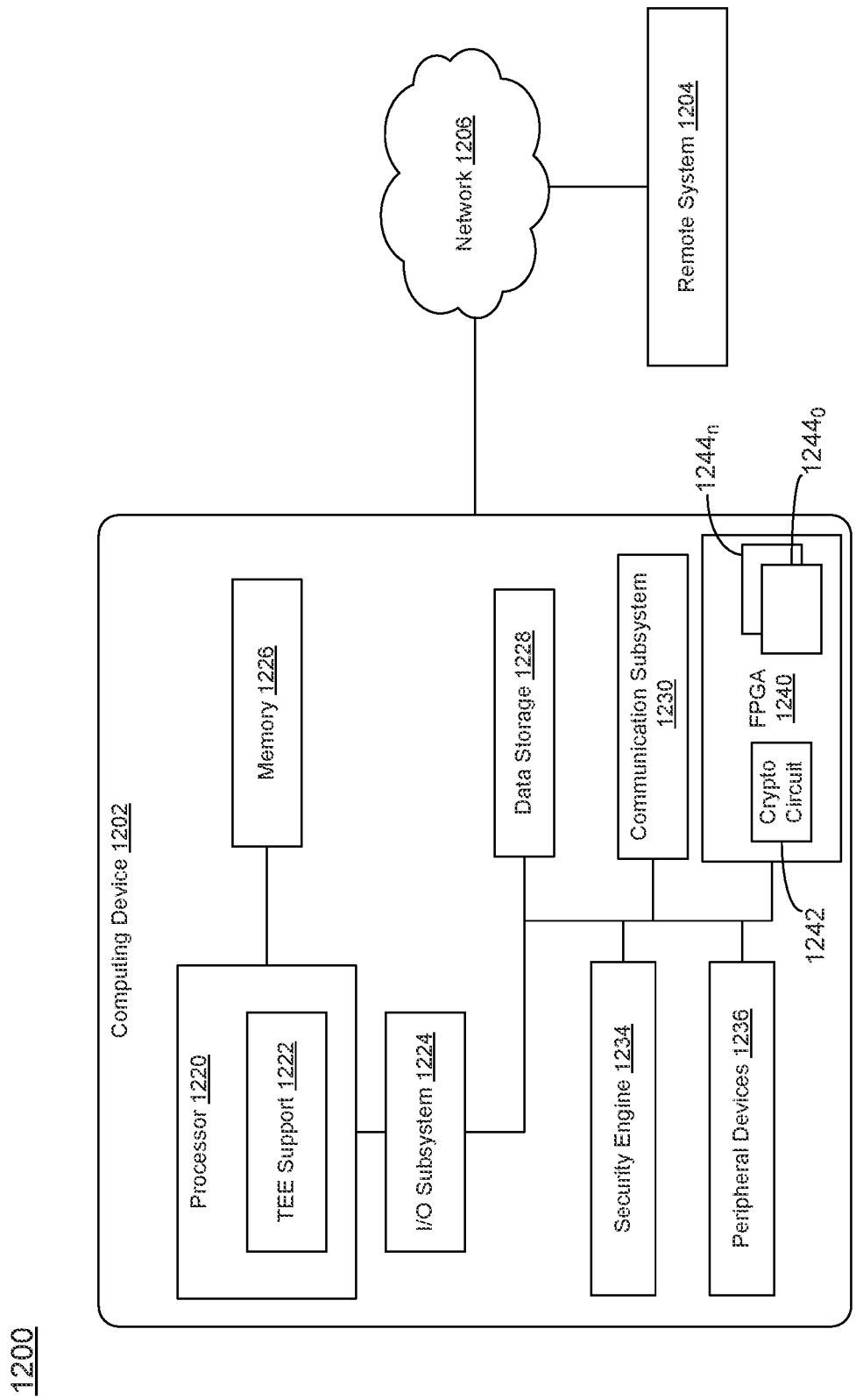
FIG. 12 is a block diagram of a system in accordance with an embodiment of the present invention.

Referring now to FIG. 12, shown is a block diagram of a system 1200 in accordance with an embodiment of the present invention. As shown, system 1200 includes a computing device 1202 having a processor 1220 and an FPGA 1240. System 1200 may also include a remote system 1204 in communication with the computing device 1202 via a network 1206, with which it may participate in cryptographic operations using hardware circuitry and techniques described herein. Additionally, although illustrated as including a single computing device 1202 and remote system 1204, it should be understood that in some embodiments system 1200 may include any number of computing devices 1202 and/or remote systems 1204.

Computing device 1202 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 12, computing device 1202 illustratively includes a processor 1220, an input/output (I/O) subsystem 1224, a memory 1226, a data storage device 1228, and a communication subsystem 1230. Of course, computing device 1202 may include other or additional components, such as those commonly found in a desktop computer (e.g., various input/output devices), in other embodiments. Additionally, in some embodiments, one or more of the illustrative components may be incorporated in, or otherwise form a portion of, another component. For example, memory 1226, or portions thereof, may be incorporated in processor 1220 in some embodiments.

Processor 1220 may be embodied as a single or multicore processor, digital signal processor, microcontroller, or other processor or processing/controlling circuit. As shown, processor 1220 includes trusted execution environment (TEE) support 1222, which allows processor 1220 to establish a trusted execution environment. In one embodiment, a trusted execution environment known as a secure enclave may be established, in which executing code may be measured, verified, and/or otherwise determined to be authentic. Additionally, code and data included in the trusted execution environment may be encrypted or otherwise protected from being accessed by code executing outside of the trusted execution environment. For example, code and data included in the trusted execution environment may be protected by hardware protection mechanisms of processor 1220 while being executed or while being stored in certain protected cache memory of processor 1220. The code and data included in the trusted execution environment may be encrypted when stored in a shared cache or memory 1226. TEE support 1222 may be embodied as a set of processor instruction extensions that allows processor 1220 to establish one or more secure enclaves in memory 1226. For example, TEE support 1222 may be embodied as Intel® Software Guard Extensions (SGX) technology.

Memory 1226 may be embodied as any type of volatile or non-volatile memory or data storage capable of performing the functions described herein. In operation, memory 1226 may store various data and software used during operation of computing device 1202 such as operating systems, applications, programs, libraries, and drivers.

I/O subsystem 1224 may be embodied as circuitry/logic and/or components to facilitate input/output operations with processor 1220 and other components of the computing device 1202. For example, I/O subsystem 1224 may be embodied as, or otherwise include, memory controller hubs, input/output control hubs, platform controller hubs, integrated control circuitry/logic, firmware devices, communication links (i.e., point-to-point links, bus links, wires, cables, light guides, printed circuit board traces, etc.) and/or other components and subsystems to facilitate the input/output operations. In some embodiments, I/O subsystem 1224 may form a portion of an SoC and be incorporated, along with processor 1220, memory 1226, FPGA 1240, and other components of computing device 1202, on a single integrated circuit chip.

Data storage device 1228 may be embodied as any type of device or devices configured for short-term or long-term storage of data such as, for example, memory devices and circuits, memory cards, hard disk drives, solid-state drives, or other data storage devices. In some embodiments, data storage device 1228 may be used to store one or more executable binary images, firmware images, and/or FPGA images such as a variety of bitstreams.

Communication subsystem 1230 may be embodied as any communication circuit, device, or collection thereof, capable of enabling communications between computing device 1202 and other remote devices over a network. Communication subsystem 1230 may be configured to use any one or more communication technology (e.g., wired or wireless communications) and associated protocols (e.g., Ethernet, Bluetooth®, Wi-Fi®, WiMAX, etc.) to effect such communication.

As described above, computing device 1202 includes an FPGA 1240. FPGA 1240 may be embodied, in one embodiment, as an integrated circuit including a single semiconductor die having programmable digital logic resources that may be configured after manufacture, for example by a system integrator or an end user. FPGA 1240 may include, for example, a configurable array of logic blocks in communication over a configurable data interchange. More specifically as shown in FIG. 12, FPGA 1240 may include multiple programmable arrays $1244_0$-$1244_n$. FPGA 1240 of course includes additional control circuitry to enable incoming bitstreams to program these arrays. Still further as described herein, FPGA 1240 includes a cryptographic circuit 1242, which may take the form of PKC 100 of FIG. 1, as an example. In this way, when FPGA 1240 receives an incoming bitstream, cryptographic circuit 1242 may perform sign and verification operations to confirm an authenticity of the bitstream prior to programming a given one of arrays 1244 with the bitstream. Of course, cryptographic circuit 1242 may further perform additional cryptographic operations such as key operations during normal execution within FPGA 1240.

As shown, computing device 1202 may also include a security engine 1234 and one or more peripheral devices 1236. Security engine 1234 may be embodied as any hardware component(s) or circuitry/logic capable of providing manageability and security-related services to computing device 1202, such as a converged security and manageability engine (CSME) provided by Intel Corporation. In particular, security engine 1234 may include a microprocessor, microcontroller, or other embedded controller capable of executing firmware and/or other code independently and securely from processor 1220. Thus, security engine 1234 may be used to establish a trusted execution environment for computing device 1202. Security engine 1234 may communicate with processor 1220 and/or other components of computing device 1202 over a dedicated bus, such as a host embedded controller interface (HECI). Security engine 1234 may also provide remote configuration, control, or management of computing device 1202.

Further, in some embodiments, security engine 1234 is also capable of communicating using communication subsystem 1230 or a dedicated communication circuit independently of the state of computing device 1202 (e.g., independently of the state of main processor 1220), also known as "out-of-band" communication. Security engine 1234 may be incorporated in a SoC of computing device 1202; however, in some embodiments, computing device 1202 may include one or more additional components capable of establishing a trusted execution environment, such as an out-of-band processor, a Trusted Platform Module (TPM), and/or another security engine device or collection of devices.

Peripheral devices 1236 may include any number of additional input/output devices, interface devices, and/or other peripheral devices. For example, in some embodiments, peripheral devices 1236 may include a display, touch screen, graphics circuitry, keyboard, mouse, speaker system, microphone, network interface, and/or other input/output devices and interface devices. In addition, a given peripheral device may include an FPGA.

Remote system 1204 may be embodied as any type of computation or computer device capable of performing the functions described herein, including, without limitation, a computer, a multiprocessor system, a server, a rack-mounted server, a blade server, a network appliance, a distributed computing system, a processor-based system, and/or a consumer electronic device. As such, remote system 1204 may be embodied as a single server computing device or a collection of servers and associated devices. For example, in some embodiments, remote system 1204 may be embodied as a "virtual server" formed from multiple computing devices distributed across network 1206 and operating in a public or private cloud. Remote system 1204 may include a processor, an I/O subsystem, a memory, a data storage device, a communication subsystem, and/or other components and devices commonly found in a server or similar computing device, which may be similar to the corresponding components of computing device 1202

Computing device 1202 and remote system 1204 may be configured to transmit and receive data with each other and/or other devices of system 1200 over network 1206. Network 1206 may be embodied as any number of various wired and/or wireless networks. For example, network 1206 may be embodied as, or otherwise include, a wired or wireless local area network (LAN), a wired or wireless wide area network (WAN), a cellular network, and/or a publicly-accessible, global network such as the Internet or RF network. As such, network 1206 may include any number of additional devices, such as additional computers, routers, and switches, to facilitate communications among the devices of system 1200.

The following examples pertain to further embodiments.

In one example, an apparatus includes a hardware accelerator to execute cryptography operations including an RSA operation and an ECC operation. In this example, the hardware accelerator comprises: a multiplier circuit comprising a parallel combinatorial multiplier; and an ECC circuit coupled to the multiplier circuit to execute the ECC operation, the ECC circuit to compute a prime field multiplication using the multiplier circuit and to reduce a result of the prime field multiplication in a plurality of addition and subtraction operations for a first type of prime modulus, where the hardware accelerator is to execute the RSA operation using the multiplier circuit.

In an example, the ECC circuit is to reduce a result of the prime field multiplication in a plurality of multiplication operations for a second type of prime modulus.

In an example, the multiplier circuit comprises a 27-bit× 411-bit parallel combinatorial multiplier to multiply a first 384-bit value and a second 384-bit value in 16 clock cycles.

In an example, the hardware accelerator is to isolate first and second portions of first and second values and send the isolated first and second portions to the multiplier circuit to generate a plurality of partial products.

In an example, the multiplier circuit is to perform a plurality of 384-bit multiply-accumulate operations on the first and second portions of the first and second values to generate a plurality of 768-bit products.

In an example, the multiplier circuit is to further accumulate at least some of the plurality of 768-bit products to generate a portion of a multiplication of two 3072-bit values.

In an example, the multiplier circuit comprises: at least one register file including a plurality of registers; a multiplexer coupled to the register file; a multiplier coupled to the at least one register file and the multiplexer; an adder; a storage element; and a controller to cause operations to be performed in the multiplier circuit.

In an example, the controller is, for a plurality of iterations, to cause the multiplexer to send a selected portion of a first operand and a selected portion of a second operand to the multiplier, the multiplier to store a result in a first register of the at least one register file and accumulate the result with an accumulated value in the storage element.

In an example, the ECC circuit comprises: a verification circuit; a scalar multiplier; a prime field adder; a prime field subtractor; and a prime field multiplier.

In an example, the ECC circuit comprises a plurality of layers including: a first layer comprising the prime field adder, the prime field subtractor and the prime field multiplier; a second layer comprising a point addition and point doubling circuit and a prime field exponentiation and prime field inversion circuit; a third layer comprising the scalar multiplier; and a fourth layer comprising the verification circuit.

In an example, the prime field multiplier is to provide a first 384-bit value and a second 384-bit value to the multiplier circuit to generate an integer intermediate product, and where the ECC circuit is to reduce the integer intermediate product to a prime field result.

In an example, the hardware accelerator further comprises a RSA firmware to execute a modulus exponentiation operation using the multiplier circuit.

In another example, a method comprises: receiving, in a controller of a hardware cryptographic circuit, a request to perform an ECC operation; in response to the request, causing, by the controller, a hardware multiplication circuit of the hardware cryptographic circuit to perform an integer multiplication on a first operand and a second operand to obtain a first result, where the first operand and the second operand comprise 384-bit values, and the multiplication circuit comprises a 27-bit×411-bit multiplier; determining whether a modulus reduction operation for the ECC operation is to be performed according to a NIST prime value; and in response to determining that the modulus reduction operation is to be performed according to the NIST prime value, performing the modulus reduction operation comprising a plurality of addition and subtraction operations, and without performing any multiplication or division operations.

In an example, the method further comprises in response to determining that the modulus reduction operation is not to be performed according to the NIST prime value, performing the modulus reduction operation comprising a plurality of multiplication operations on a most significant portion of the first result.

In an example, the method further comprises: performing operations for a plurality of iterations, the operations comprising: multiplying a constant with the most significant portion of the first result to obtain a second result; multiplying a most significant portion of the second result with a prime modulus to obtain a third result; and reducing the most significant portion of the first result with the third result, and left shifting the first result by a predetermined amount.

In an example, the method further comprises: determining if the most significant portion of the first result is greater than the prime modulus; and in response to determining that the most significant portion of the first result is greater than the prime modulus, setting a reduction result equal to a difference of the most significant portion of the first result and the prime modulus.

In an example, the method further comprises in response to determining that the most significant portion of the first result is not greater than the prime modulus, setting the reduction result equal to a most significant portion of the first result.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, an apparatus comprises: a semiconductor die, which may include: a field programmable gate array including a plurality of programmable arrays, where the plurality of programmable arrays are to be programmed in response to at least one bitstream; and a cryptographic circuit coupled to the field programmable gate array, the cryptographic circuit to receive the at least one bitstream and verify authenticity of the at least one bitstream before the plurality of programmable arrays are to be programmed therewith.

In an example, the cryptographic circuit comprises: an ECC hardware circuit to execute ECC operations; an RSA circuit to execute RSA operations; and a multiplication hardware circuit coupled to the ECC hardware circuit and the RSA circuit, where the multiplication circuit is to compute 784-bit products for the ECC operations and 784-bit products for the RSA operations.

In an example, the RSA circuit is to perform an RSA-3072 operation, the RSA circuit to interface with a memory to send isolated first and second 384-bit values of a first operand comprising 3072-bits and send isolated first and second 384-bit values of a second operand comprising 3072-bits to the multiplication hardware circuit, to enable the multiplication hardware circuit to generate a plurality of partial products and accumulate the plurality of partial products to obtain an intermediate result, the RSA circuit to reduce the intermediate result using the multiplication hardware circuit.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one computer readable storage medium having stored thereon instructions, which if performed by a machine cause the machine to perform a method comprising:

receiving, in a controller of a hardware cryptographic circuit, a request to perform an elliptic curve cryptography (ECC) operation;

in response to the request, causing, by the controller, a hardware multiplication circuit of the hardware cryptographic circuit to perform an integer multiplication on a first operand and a second operand to obtain a first result, wherein the first and second operands comprise first and second 384-bit values, respectively, and the multiplication circuit comprises a 27-bit×411-bit parallel combinatorial multiplier;
determining whether a modulus reduction operation for the ECC operation is to be performed according to a National Institute of Standards and Technology (NIST) prime value; and
in response to determining that the modulus reduction operation is to be performed according to the NIST prime value, performing the modulus reduction operation comprising a plurality of addition and subtraction operations, and without performing any multiplication or division operations.

2. The at least one computer readable storage medium of claim 1, wherein the 27-bit×411-bit parallel combinatorial multiplier of the multiplier circuit is to multiply the first 384-bit value and the second 384-bit value in 16 clock cycles.

3. The at least one computer readable storage medium of claim 1, wherein the method further comprises:
using a hardware accelerator to execute the ECC operation and a Rivest Shamir Adleman (RSA) operation, wherein the hardware accelerator comprises the hardware cryptographic circuit; and
wherein the operation of using the hardware accelerator to execute the RSA operation comprises using the 27-bit× 411-bit parallel combinatorial multiplier of the multiplier circuit to multiply a third 384-bit value and a fourth 384-bit value.

4. The at least one computer readable storage medium of claim 3, wherein:
the hardware accelerator further comprises an ECC circuit; and
the ECC circuit is to use the hardware multiplication circuit to perform the integer multiplication on the first operand and the second operand to compute a prime field multiplication.

5. The at least one computer readable storage medium of claim 1, wherein the method further comprises in response to determining that the modulus reduction operation is not to be performed according to the NIST prime value, performing the modulus reduction operation comprising a plurality of multiplication operations on a most significant portion of the first result.

6. The at least one computer readable storage medium of claim 5, wherein the method further comprises performing operations for a plurality of iterations, the operations comprising:
multiplying a constant with the most significant portion of the first result to obtain a second result;
multiplying a most significant portion of the second result with a prime modulus to obtain a third result; and
reducing the most significant portion of the first result with the third result, and left shifting the first result by a predetermined amount.

7. The at least one computer readable storage medium of claim 6, wherein the method further comprises:
determining if the most significant portion of the first result is greater than the prime modulus; and
in response to determining that the most significant portion of the first result is greater than the prime modulus, setting a reduction result equal to a difference of the most significant portion of the first result and the prime modulus.

8. The at least one computer readable storage medium of claim 7, wherein the method further comprises in response to determining that the most significant portion of the first result is not greater than the prime modulus, setting the reduction result equal to a most significant portion of the first result.

9. An apparatus comprising:
a hardware accelerator to execute cryptography operations;
a multiplication circuit in the hardware accelerator;
a 27-bit×411-bit parallel combinatorial multiplier in the multiplication circuit, wherein the multiplication circuit is to use the 27-bit×411-bit parallel combinatorial multiplier to perform an integer multiplication on a first operand and a second operand to obtain a first result, wherein the first and second operands comprise first and second 384-bit values, respectively; and
an elliptic curve cryptography (ECC) circuit in the hardware accelerator, the ECC circuit to:
determine whether a modulus reduction operation for an ECC operation is to be performed according to a National Institute of Standards and Technology (NIST) prime value; and
in response to determining that the modulus reduction operation is to be performed according to the NIST prime value, perform the modulus reduction operation comprising a plurality of addition and subtraction operations, and without performing any multiplication or division operations.

10. An apparatus according to claim 9, wherein the 27-bit×411-bit parallel combinatorial multiplier of the multiplier circuit is to multiply the first 384-bit value and the second 384-bit value in 16 clock cycles.

11. A computing device comprising:
a hardware accelerator according to claim 9; and
a main processor in communication with the hardware accelerator.

12. An apparatus according to claim 9, wherein the hardware accelerator is further to execute a Rivest Shamir Adleman (RSA) operation, wherein to execute the RSA operation comprises to use the 27-bit×411-bit parallel combinatorial multiplier of the multiplier circuit to multiply a third 384-bit value and a fourth 384-bit value.

13. An apparatus according to claim 12, further comprising:
an ECC circuit in the hardware accelerator, wherein the ECC circuit is to use the hardware multiplication circuit to perform the integer multiplication on the first operand and the second operand to compute a prime field multiplication.

14. An apparatus according to claim 13, wherein the ECC circuit comprises an elliptic curve (EC) scalar multiplier.

15. An apparatus according to claim 9, wherein, in response to determining that the modulus reduction operation is not to be performed according to the NIST prime value, the ECC circuit is to perform the modulus reduction operation comprising a plurality of multiplication operations on a most significant portion of the first result.

16. An apparatus according to claim 15, wherein to perform the modulus reduction operation comprises to perform operations for a plurality of iterations, the operations comprising:
multiplying a constant with the most significant portion of the first result to obtain a second result;
multiplying a most significant portion of the second result with a prime modulus to obtain a third result; and
reducing the most significant portion of the first result with the third result, and left shifting the first result by a predetermined amount.

17. An apparatus according to claim 16, wherein the operations further comprise:
   determining if the most significant portion of the first result is greater than the prime modulus; and
   in response to determining that the most significant portion of the first result is greater than the prime modulus, setting a reduction result equal to a difference of the most significant portion of the first result and the prime modulus.

18. An apparatus according to claim 17, wherein the operations further comprise:
   in response to determining that the most significant portion of the first result is not greater than the prime modulus, setting the reduction result equal to a most significant portion of the first result.

19. An apparatus comprising:
   a hardware accelerator to execute cryptography operations including a Rivest Shamir Adleman (RSA) operation and an elliptic curve cryptography (ECC) operation, the hardware accelerator comprising:
      a multiplier circuit comprising a 27-bit×411-bit parallel combinatorial multiplier to multiply a first 384-bit value and a second 384-bit value, wherein the hardware accelerator is to execute the RSA operation using the multiplier circuit; and
      an ECC circuit coupled to the multiplier circuit to execute the ECC operation, the ECC circuit to compute a prime field multiplication using the multiplier circuit and to reduce a result of the prime field multiplication in a plurality of addition and subtraction operations for a first type of prime modulus.

20. An apparatus according to claim 19, wherein:
   the 27-bit×411-bit parallel combinatorial multiplier is to perform an integer multiplication on the first 384-bit value and the second 384-bit value to obtain a first result; and
   to execute the ECC operation comprises to:
      determine whether a modulus reduction operation for the ECC operation is to be performed according to a National Institute of Standards and Technology (NIST) prime value; and
      in response to determining that the modulus reduction operation is to be performed according to the NIST prime value, perform the modulus reduction operation comprising a plurality of addition and subtraction operations, and without performing any multiplication or division operations.

21. A computing device comprising:
   a hardware accelerator according to claim 19; and
   a main processor in communication with the hardware accelerator.

* * * * *